(12) United States Patent
Holub et al.

(10) Patent No.: US 11,934,433 B2
(45) Date of Patent: * Mar. 19, 2024

(54) ITERATIVE BUILDING OF SEARCH EXPRESSIONS TO MATCH SPECIFIED STRING VALUES

(71) Applicant: Rapid7, Inc., Boston, MA (US)

(72) Inventors: Viliam Holub, Prague (CZ); Trevor Parsons, Swampscott, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,418

(22) Filed: Sep. 19, 2022

(65) Prior Publication Data
US 2023/0021190 A1    Jan. 19, 2023

Related U.S. Application Data

(63) Continuation of application No. 16/175,954, filed on Oct. 31, 2018, now Pat. No. 11,487,796.

(51) Int. Cl.
*G06F 16/00* (2019.01)
*G06F 16/33* (2019.01)
*G06F 16/332* (2019.01)
*G06F 18/214* (2023.01)

(52) U.S. Cl.
CPC ...... *G06F 16/3338* (2019.01); *G06F 16/3323* (2019.01); *G06F 16/3328* (2019.01); *G06F 18/214* (2023.01)

(58) Field of Classification Search
None
See application file for complete search history.

(56) References Cited

U.S. PATENT DOCUMENTS

2006/0167873 A1 * 7/2006 Degenaro ........... G06F 9/45512
2019/0258904 A1   8/2019 Ma et al.

OTHER PUBLICATIONS

Title: "Learning Text Patterns using Separate-and-Conquer Genetic Programming". Author: Alberto Bartoli, Andrea De Lorenzo, Eric Medvet, and Pabiano Tarlao. Published Mar. 15, 2015. Publisher: SpringerLink. Pertinent pp. 1-12. (Year: 2015) (Year: 2015).*

* cited by examiner

*Primary Examiner* — Anhtai V Tran
(74) *Attorney, Agent, or Firm* — Ashwin Anand

(57) ABSTRACT

Methods and systems for generating a search expression. The system begins with an empty search expression, and iteratively expands the search expression until some terminating condition is reached.

20 Claims, 4 Drawing Sheets

FIG. 2

ITERATIVE BUILDING OF SEARCH EXPRESSIONS TO MATCH SPECIFIED STRING VALUES

This Application claims priority under 35 U.S.C. § 120 and is a continuation of U.S. patent application Ser. No. 16/175,954 filed Oct. 31, 2018, titled "Search Expression Generation," the entire contents of which are incorporated herein by reference in its entirety.

TECHNICAL FIELD

Embodiments described herein generally relate to systems and methods for generating search expressions.

BACKGROUND

Search expressions such as regular expressions are patterns used to perform searches and extractions of text. One existing technique for inferring or otherwise creating expressions is to employ heavy algorithmic approximations. However, these algorithmic approximations are undesirably slow.

Another existing technique is to employ template generators. Template generators are more practical than algorithmic approximations, but overall do not perform complete searches.

Yet another existing technique enables users to select fields in a training set and automatically export regular expression capture groups. Internally, this technique is based on a fixed set of rules or regular expression patterns that are generated and tested against a training set. If a selected field does not fit into specified templates, the tool fails. While this approach is practical, the main disadvantages are its limited resolution to only a set of templates and its sensitivity to the training set. Also, it often fails to recognize fields.

A need exists, therefore, for systems and methods for generating search expressions that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for generating a search expression. The method includes receiving, using an interface, a selection of at least one training set from a text string; generating an initial search expression using a processor executing instructions stored on a memory; and iteratively expanding, using the processor, the initial search expression by adding at least one of a positive character set, a negative character set, and a quantifier to a previous search expression until at least one terminating condition is reached.

In some embodiments, the at least one terminating condition includes at least one of a generated search expression matching all fields of the at least one training set and a maximum number of iterations.

In some embodiments, the method further includes evaluating the expanded search expression after each iteration. In some embodiments, evaluating the expanded search expression includes evaluating how well the expanded search expression matches the at least one training set. In some embodiments, the method further includes rejecting the expanded search expression upon the expanded search expression matching the at least one training set less accurately than the search expression prior to expansion.

In some embodiments, evaluating the expanded search expression includes evaluating the expanded search expression based on at least one of its length, complexity, generalization, and computational effectiveness. In some embodiments, the length of the expanded search expression is shorter than the length of the search expression prior to expansion.

In some embodiments, the method further includes receiving, using a user interface, instructions regarding a desired search expression from a user.

In some embodiments, the method further includes selecting at least one expanded search expression using a user interface.

According to another aspect, embodiments relate to a system for generating a search expression. The system includes an interface for receiving a selection of at least one training set from a text string; and a processor executing instructions stored on a memory to generate an initial search expression and iteratively expand the initial search expression by adding at least one of a positive character set, a negative character set, and a quantifier to a previous search expression until at least one terminating condition is reached.

In some embodiments, the at least one terminating condition includes at least one of a generated search expression matching all fields of the at least one training set and a maximum number of iterations.

In some embodiments, the processor is further configured to evaluate the expanded search expression after each iteration. In some embodiments, the processor evaluates the expanded search expression by evaluating how well the expanded search expression matches the at least one training set. In some embodiments, the processor is further configured to reject the expanded search expression upon the expanded search expression matching the at least one training set less accurately than the search expression prior to expansion.

In some embodiments, the processor evaluates the expanded search expression based on at least one of its length, complexity, generalization, and computational effectiveness. In some embodiments, the length of the expanded search expression is shorter than the length of the search expression prior to expansion.

In some embodiments, the system further includes a user interface configured to receive instructions regarding a desired search expression from a user.

In some embodiments, the processor is further configured to select at least one expanded search expression using a user interface.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

FIG. 2 depicts a screenshot of search expression generation using the system of FIG. 1 in accordance with one embodiment;

DETAILED DESCRIPTION

Figure 1:
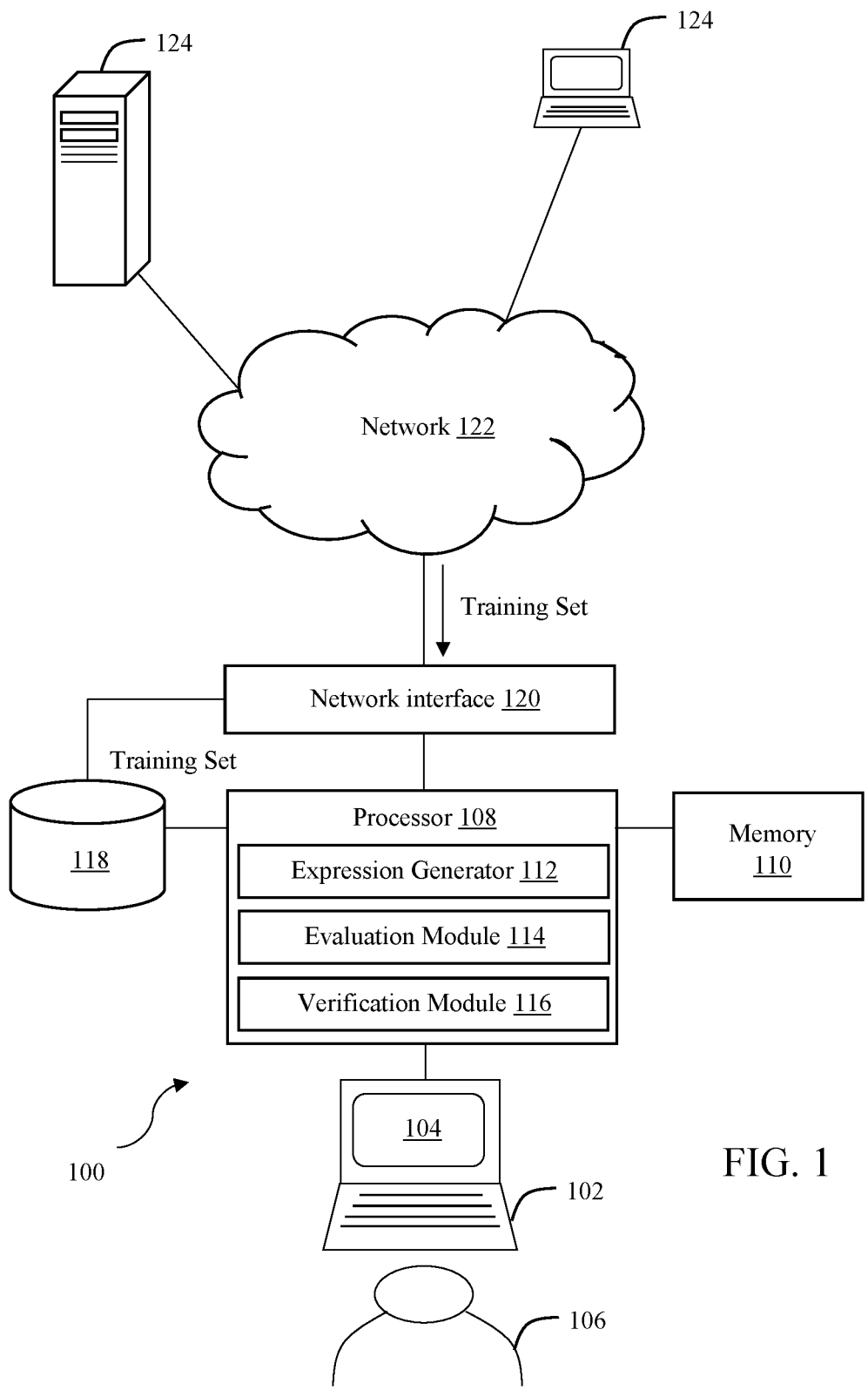
FIG. 1 illustrates a system for generating a search expression in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Search expressions are essentially patterns that match character combinations in strings. A user may want a search expression to match different types of data that commonly appear in unstructured log lines, for example.

A regular expression is a type of search expression and may comprise simple characters, special characters, or a combination of simple and special characters. Simple patterns are constructed of characters for which a user wants to find a direct match. For example, "/abc/" matches strings that contain the characters "abc" only when they occur together and in that order.

Special characters allow a search expression to match more than just direct matches in a string. Special characters may include symbols such as *, +, $, ^, †, ?, wherein each of these symbols represent some specific meaning with respect to how a search is performed.

In some scenarios, a user may want to write a search expression to capture a particular field that consistently reoccurs. However, users may have difficulty in writing the appropriate search expression to accurately match the desired fields. For example, it may be difficult for a user to determine which symbols should be in the search expression and in what order.

A project described in "Inference of Regular Expressions for Text Extraction from Examples" by Bartoli, et al, IEEE Transactions on Knowledge and Data Engineering Volume: 28, Issue: 5, May 1, 2016, is available as an online tool available at http://regex.inginf.units.it/. However, this tool is insufficient for most search expression generation purposes as it is unable to extract more than one field. Additionally, this tool requires an extensive amount of time for generating search expressions.

Another existing technique is the Universal Field Extractor available as a Splunkbase™ add-on. This technique enables users to select fields in a training set, and automatically export regular expression capture groups. Internally, it is based on a fixed set of rules and regular expression patterns that are generated and tested against a training set. If a selected field does not fit into specified templates, the tool fails. Accordingly, this is a practical, yet crude tool. Its main disadvantages are its limited resolution to only a set of templates and its sensitivity to the training set.

The systems and methods in accordance with the various embodiments described herein transform a training set input into a search expression. The training set input may comprise a plurality of sample log lines with delimited fields to capture, for example. Additionally or alternatively, the training set input may include sample log lines with no fields that act as counter-examples. Based on the provided training set, the systems and methods described herein may automatically infer and generate appropriate search expressions.

FIG. 1 illustrates a system 100 for generating a search expression in accordance with one embodiment. The system 100 includes a user device 102 executing a user interface 104 to allow a user 106 to, for example, input instructions regarding search expression generation and to view generated search expressions. For example, the user 106 may specify a number of fields of a log file for a generated search expression to match.

Once presented with one or more generated search expressions, the user 106 may select one or more generated search expressions for execution/further use. Additionally or alternatively, the system 100 may autonomously select and output the most appropriate generated search expression(s) based on one or more criteria, discussed below.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

As discussed above, the user interface 104 may enable the user 106 to input instructions regarding search expressions. The user interface 104 may further present data regarding the training set and the generated search expressions to the user 106.

The user device 102 may be in operable communication with a processor 108. The processor 108 may be any hardware device capable of executing instructions stored on memory 110 to generate one or more search expressions to accomplish the features of various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor 108 may be configured as part of the user device 102 on which the user interface 104 executes, such as a laptop, or may be located at some remote location.

The processor 108 may execute instructions stored on memory 110 to provide various modules that together generate a search expression. These may include an expression generator 112, an evaluation module 114, and a verification module 116. The processor 108 may also be in communication with one or more databases 118.

The processor 108 may be in operable communication with a network interface 120 to receive a selection of at least one training set from a text string. The training set may be communicated over one or more networks 122 from one or more network devices 124 or directly from the one or more databases 118.

The network(s) 122 may link the various devices with various types of network connections. The network(s) 122 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 122 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, a sample set may be "192.168.11.177—[22/Aug/2009:01:32:19+−100] "GET/node/feed." The expression generator 112 may start with an empty search expression and iteratively generate search expressions based on the A* algorithm.

For example, the expression generator 112 may generate an initial search expression such as "^". The expression generator 112 may then expand this expression to explore expressions such as "^l", "^˜", "^.{1}", "^.{1}", "^[^]", "^[^]{1}", "^[^]{2}", "^[^]++", "^[^ ]++", "^[^]++", etc. In accordance with the A* algorithm, the expression generator 112 may construct the search expressions based on the cost associated with generating an expanded search expression and the cost associated with reaching an optimal search expression.

Accordingly, the expression generator 112 may explore options of how to extend the search expression. On each iteration, the expression generator 112 expands the most promising search expressions with all possible continuations. The expression generator 112 may expand the search expression by at least one of a positive character set, a negative character set, quantifiers, groups, atomic groups, as well as special cases thereof.

The evaluation module 114 may evaluate the expanded search expression after each iteration. The evaluation module 114 may be configured to, based on instructions provided by the user 106, give preference towards shorter and simpler search expressions as opposed to longer and more complex search expressions.

The verification module 116 may test each expanded search expression against the training set. The verification module 116 may reject a search expression if some samples do not match or if a sample matches beyond a field boundary for some, but not all of the samples. Search expressions that pass or are otherwise satisfactory are compared to other search expressions that have made similar progress in the sample set. For example, search expressions that are equal with respect to their matching ability may be compared to each other based on their length, complexity, etc.

Figure 2:
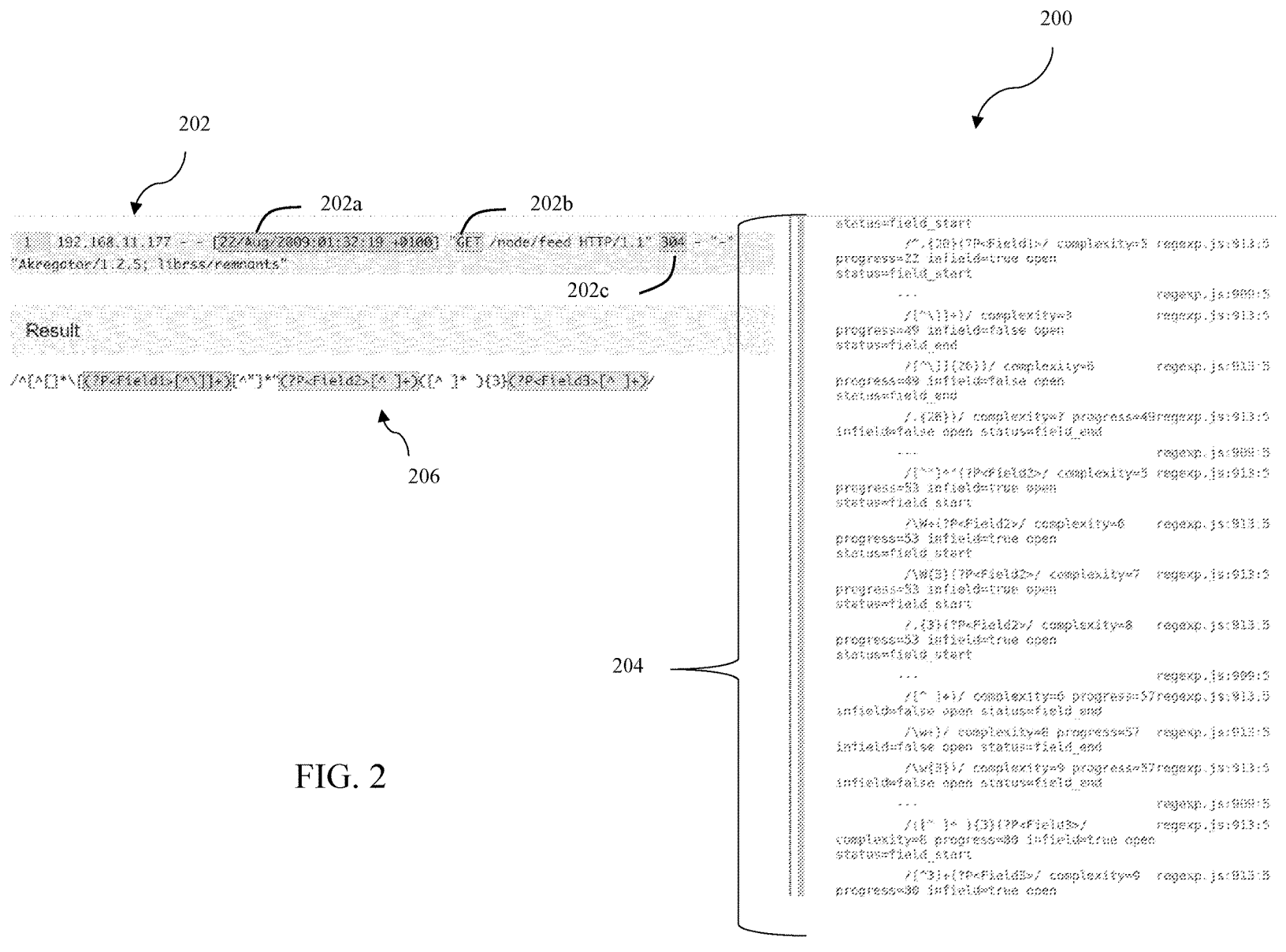

FIG. 2 depicts a screenshot 200 of search expression generation using the system 100 of FIG. 1 in accordance with one embodiment. The screenshot 200 presents a sample set 202. In this embodiment, a user 106 may want a search expression that matches the timestamp field 202a, the method field 202b, and the response code field 202c.

The expression generator 112 may begin with an empty search expression. The expression generator 112 may then iteratively expand the initial search expression to produce several search expressions 204. After each iteration (i.e., after a new search is expression is generated), the evaluation module 114 may evaluate the newly-generated search expression based on at least one of its length, complexity, generality, and computational effectiveness.

For example, the evaluation module 114 may apply one or more metrics to evaluate the generated search expression(s). As mentioned previously, preference may be given to shorter and less complex expressions as opposed to longer and more complex expressions. As another example, search expressions that are more computationally effective (i.e., can match the required fields) are of course preferred over expressions that are not as effective or satisfactory.

The verification module 116 may verify the effectiveness of generated search expressions by testing them against the training set. The verification module 116 may reject expressions that do not satisfactorily match the required fields. Satisfactory search expressions may be added to the database 118 for storage and/or subsequent use or analysis. The output of the processor 108 may be one or more generated search expressions selected based on the one or more applied metrics.

Figure 3:
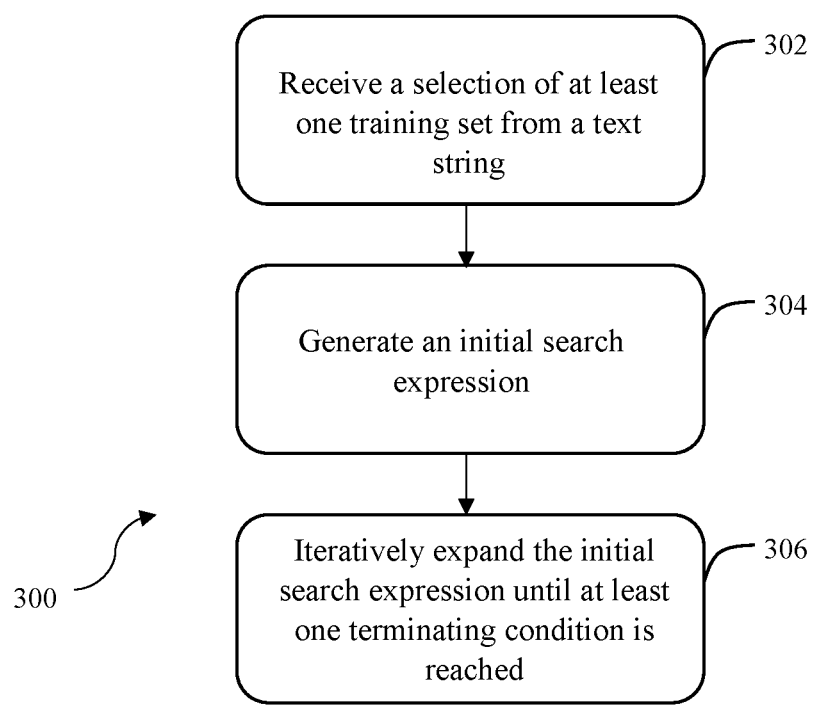
FIG. 3 depicts a flowchart of a method for generating a search expression in accordance with one embodiment.

FIG. 3 depicts a flowchart of a method 300 for generating a search expression in accordance with one embodiment. Step 302 involves receiving, using an interface, a selection of at least one training set from a text string. The text string may be part of a collection of unstructured log lines, for example.

Step 304 involves generating an initial search expression using a processor executing instructions stored on a memory. The expression generator 112 of FIG. 1 may perform this step, for example.

Step 306 involves iteratively expanding, using the processor, the initial search expression by adding at least one of a positive character set, a negative character set, and a quantifier to a previous search expression until at least one terminating condition is reached. The expression generator 112 of FIG. 1 may perform this step, for example. The terminating condition may be once a generated search expression matches all fields of the training set or after a maximum number of iterations.

Figure 4:
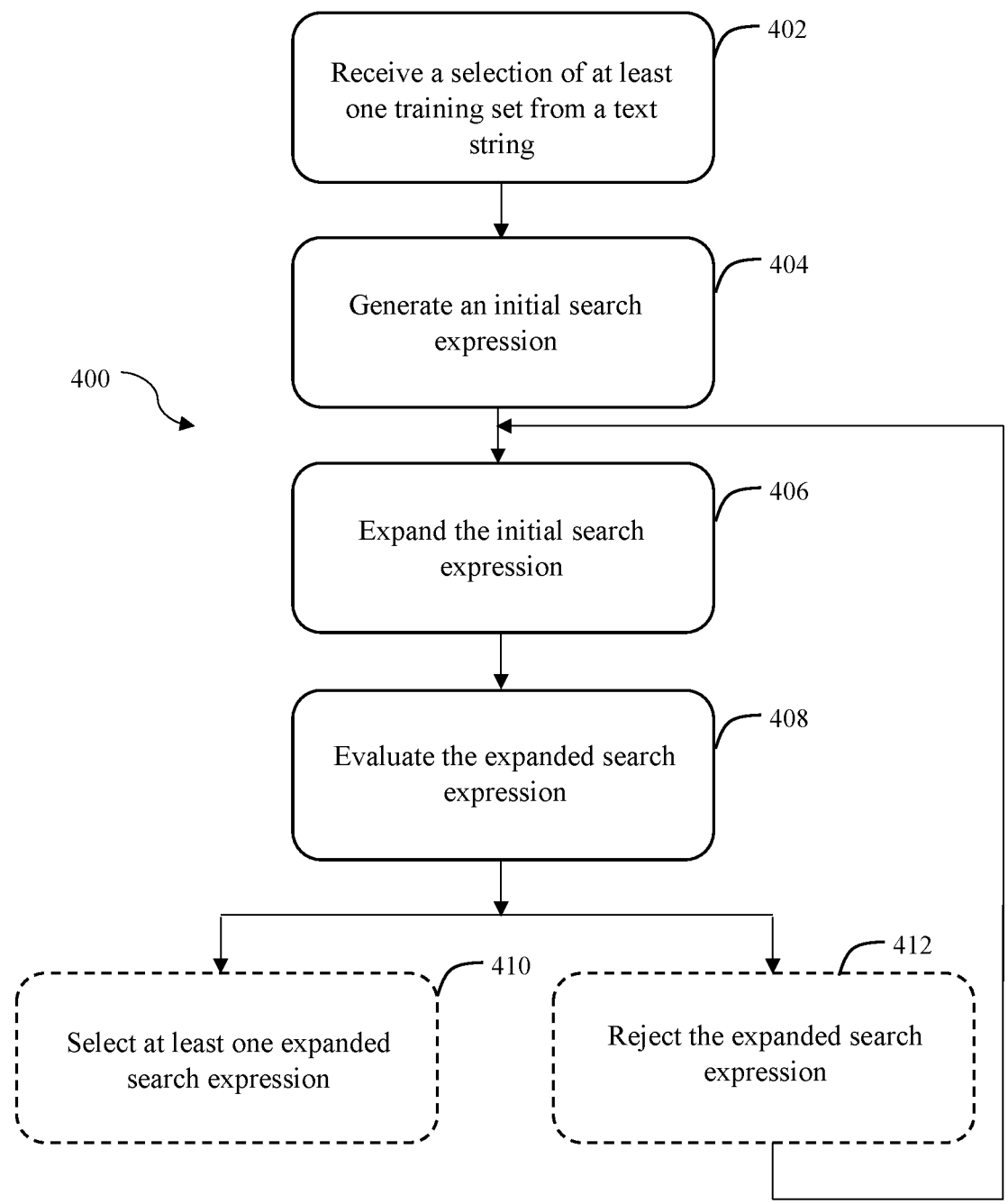
FIG. 4 depicts a flowchart of a method for generating a search expression in accordance with another embodiment.

FIG. 4 depicts a flowchart of a method 400 for generating a search expression in accordance with another embodiment. Steps 402 and 404 of FIG. 4 are similar to steps 302 and 304, respectively, of FIG. 3 and are not repeated here.

Step 406 involves expanding the initial search. As discussed previously, the expression generator 112 may expand the search expression by at least one of a positive character, a negative character set, one or more quantifiers, etc. The character set that expands a given expression is inferred from samples that are delimited by the positions of the start or end of fields in that sample. Accordingly, the processor 108 may expand the search expression(s) by exploring different regular expressions based on any one or more of simple or special characters as discussed above.

Step 408 involves evaluating the expanded search expression. The evaluation module 114 of FIG. 1 may perform this step. The evaluation module 114 may evaluate the generated expanded search expression based on at least one of the expression's length, complexity, generality, computational effectiveness, or any other desirable expression property. As described above, the verification module 116 may also test the search expression against a sample set as part of this evaluation step.

Based on the results of the evaluation step 408, the method 400 may proceed to step 410 or step 412. Step 410 involves selecting at least one expanded search expression. The processor 108 may select one or more expressions for further use, presentation to a user 106, or storage for later use. The processor 108 may select the at least one expanded search expression based on any one or more of the criteria discussed above.

Similarly, the processor 108 may also present a list of generated search expressions to the user 106 using the user interface 104. For example, the user interface 104 may present a list of the expressions such as the list of search expressions 204 of FIG. 2. A user 106 may therefore have the opportunity to review the generated expressions and even select one or more expressions for execution.

On the other hand, step 412 involves rejecting an expanded search expression. The evaluation module 114 may reject a particular search expression if, for example, it does not satisfactorily match a sample. The evaluation module 114 may similarly reject an expanded search expression based on its length exceeding some threshold, for example.

After step 412, the method 400 may return back to step 406. Steps 406 and 408 are then iterated or otherwise repeated until some terminating condition is reached. That is, the previous search expression is further expanded and then evaluated. As discussed in conjunction with the previous iteration, the evaluation module 114 may then either select the new search expression or reject the new search expression.

A terminating condition may be that a search expression accurately matches all fields of a training set. Or, as another example, a user may set a maximum number of iterations. After the method 400 executes the maximum number of iterations, the most successful search expression with respect to one or more metrics such as discussed above may be selected.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
performing, by one or more computing devices that implements a search expression generator:
determining an initial expression to begin generation of a search expression, wherein the search expression is to be generated based on desired instances of a field in a training set of text strings;
performing an iterative process, wherein individual iterations of the iterative process comprises:
expanding the search expression with at least one of a positive character set, a negative character set, or a quantifier based on samples in the training set,
evaluating the expanded search expression to determine how well the search expression matches the desired instances of the field in the training set, and
rejecting the expansion if the expanded search expression matches the desired instances of the field less accurately than the search expression prior to the expansion; and
terminating the iterative process when a terminating condition is reached.

2. The method of claim 1, wherein an individual iteration of the iterative process comprises:
generating multiple expanded search expressions from the search expression; and
selecting one or more of the multiple expanded search expressions for one or more later iterations of the iterative process.

3. The method of claim 2, wherein the selecting of the one or more expanded search expression for the one or more later iteration is based on one or more of:
a length of the expanded search expression,
a complexity of the expanded search expression,
a generality of the expanded search expression, and
a computational effectiveness of the search expression.

4. The method of claim 1, wherein the iterative process outputs a list of search expressions generated by at least some of the iterations.

5. The method of claim 4, wherein
the list of search expressions is outputted via a user interface, and
the initial expression is received via the user interface and selected from another list of search expressions generated previously by the search expression generator.

6. The method of claim 1, wherein the initial expression is an empty expression.

7. The method of claim 1, wherein
the search expression generator implements a user interface, and
the desired instances of the field in the training set are received via the user interface.

8. The method of claim 1, wherein the terminating condition of the iterative process is based on a maximum length of the search expression or a maximum number of iterations of the iterative process.

9. The method of claim 1, further comprising search expression generator:
storing a set of generated search expressions that matches the desired instances of the field in the training set, wherein the stored set of search expressions is used to detect additional text strings that contain the desired instances of the field.

10. The method of claim 9, wherein the training set is a log file of unstructured log lines.

11. A system comprising:
one or more processors; and
a memory coupled to the one or more processors, wherein the memory stores program instructions executable by the one or more processors to implement a search expression generator that is configured to:
determine an initial expression to begin generation of a search expression, wherein the search expression is to be generated based on desired instances of a field in a training set of text strings;
perform an iterative process, wherein individual iterations of the iterative process comprise:
expanding the search expression with at least one of a positive character set, a negative character set, or a quantifier based on samples in the training set,
evaluating the expanded search expression to determine how well the search expression matches the desired instances of the field in the training set, and rejecting the expansion if the expanded search expression matches the desired instances of the field less accurately than the search expression prior to the expansion; and terminate the iterative process when a terminating condition is reached.

12. The system of claim 11, wherein an individual iteration of the iterative process comprises:
generate multiple expanded search expressions from the search expression; and
select one or more of the multiple expanded search expressions for one or more later iterations of the iterative process.

13. The system of claim 12, wherein the selection of the one or more expanded search expression for the one or more later iteration is based on user configuration input received by the search expression generator.

14. The system of claim 12, wherein the selection of the one or more expanded search expression for the one or more later iteration is performed based on an A* search algorithm.

15. The system of claim 11, wherein the iterative process outputs a list of search expression s generated by at least some of the iterations.

16. The system of claim 15, wherein
the list of search expressions is outputted via a user interface of the search expression generator, and
the initial expression is received via the user interface and selected from another list of search expressions generated previously by the search expression generator.

17. The system of claim 11, wherein
the initial expression is a regular expression, and
an expansion of the search expression comprises modifying the regular expression to one or more additional characters.

18. The system of claim 11, wherein the training set includes text strings with no instances of the field to be matched by the search expression to act as counter examples.

19. The system of claim 11, wherein the terminating condition of the iterative process is based on a maximum length of the search expression or a maximum number of iterations of the iterative process.

20. The system of claim 11, wherein the search expression generator is configured to:
store a set of generated search expressions that matches the desired instances of the field in the training set, wherein the stored set of search expressions is used to detect log lines in a log file that contain the desired instances of the field.

\* \* \* \* \*